United States Patent
Chemin

(10) Patent No.: US 8,294,412 B2
(45) Date of Patent: Oct. 23, 2012

(54) METHOD FOR CONTROLLING A ROTARY ELECTRIC MACHINE IN CASE OF LOAD SHEDDING AND CORRESPONDING POWER CONTROL MODULE

(75) Inventor: Michaël Chemin, Festigny (FR)

(73) Assignee: Valeo Equipements Electriques Moteur, Creteil Cedex (FR)

( * ) Notice: Subject to any disclaimer, the term of this patent is extended or adjusted under 35 U.S.C. 154(b) by 362 days.

(21) Appl. No.: 12/663,391

(22) PCT Filed: May 21, 2008

(86) PCT No.: PCT/FR2008/050881
§ 371 (c)(1),
(2), (4) Date: Apr. 9, 2010

(87) PCT Pub. No.: WO2009/000989
PCT Pub. Date: Dec. 31, 2008

(65) Prior Publication Data
US 2010/0201304 A1    Aug. 12, 2010

(30) Foreign Application Priority Data

Jun. 8, 2007 (FR) ...................................... 07 55625

(51) Int. Cl.
*H02P 23/00* (2006.01)
(52) U.S. Cl. ........ 318/806; 318/727; 318/244; 318/245; 318/246; 318/247; 318/248; 318/249; 318/250; 318/251; 318/252
(58) Field of Classification Search .................. 318/806, 318/727, 244–252
See application file for complete search history.

(56) References Cited

U.S. PATENT DOCUMENTS

| 4,024,457 | A | * | 5/1977 | Riddle ........................... 323/319 |
| 4,825,139 | A | * | 4/1989 | Hamelin et al. ................. 322/90 |
| 5,227,704 | A | * | 7/1993 | Erdman .................... 318/400.34 |
| 5,631,544 | A | * | 5/1997 | Syverson et al. ............... 322/46 |

FOREIGN PATENT DOCUMENTS

| DE | 198 35 316 A1 | 2/2000 |
| EP | 1 443 623 A2 | 8/2004 |
| FR | 2 874 765 A1 | 3/2006 |

* cited by examiner

*Primary Examiner* — Walter Benson
*Assistant Examiner* — David Luo
(74) *Attorney, Agent, or Firm* — Berenato & White, LLC

(57) ABSTRACT

A method for controlling a rotary electrical machine and a control and power module for a rotary electrical machine. The rotary electrical machine includes a plurality of phase windings (9), a power circuit (12, 16) which comprises a plurality of arms each formed by a bridge of switches and which is capable of supplying an electrical network at an output voltage (Vres) equal to a nominal voltage when the bridge of switches is in a nominal mode of operation, an excitation winding (11) through which flows an excitation current (I exc) which generates a magnetic flux in a magnetic excitation circuit (10), and an electronic control circuit (7) which operates the power circuit and controls the excitation current. The method includes locking the bridge in at least one arm of the power circuit in a conductive state when the output voltage exceeds a voltage threshold higher than the nominal voltage. The nominal mode of operation of the bridge is returned to independently of the output voltage.

14 Claims, 2 Drawing Sheets

METHOD FOR CONTROLLING A ROTARY ELECTRIC MACHINE IN CASE OF LOAD SHEDDING AND CORRESPONDING POWER CONTROL MODULE

TECHNICAL FIELD OF THE INVENTION

The present invention relates to a method of controlling a rotary electrical machine connected to an electrical system, in particular a vehicle electrical system of a motor vehicle, in the event of a load dump, and to a control and power module for this machine which is adapted to implement this method.

TECHNOLOGICAL BACKGROUND OF THE INVENTION

In a motor vehicle, this vehicle electrical system serves to supply the various pieces of electrical equipment with which the vehicle is fitted. The supply is provided by at least one battery. The latter is charged, by means of a rotary electrical machine, from the energy produced by the rotation of the heat engine of the vehicle. By rotary electrical machine, what is meant, in the widest possible sense, is any single-phase or multi-phase rotary electrical machine which is used to produce d.c. output current supplying the vehicle electrical system. It may in particular be an alternator or an alternator-starter.

In the event of an electrical load suddenly being disconnected from the vehicle electrical system, or from a battery, or from both, a phenomenon known as a load dump occurs which causes an over-voltage in the vehicle electrical system. What happens is that, because a system for regulating a generating current in the machine is unable to act quickly enough following a load dump, the machine continues to produce the same output current even though the current consumption on the side on which the vehicle electrical system is situated has dropped.

Conventionally, the battery of the vehicle is a 14 volt battery. In principle, due to its low internal resistance, it limits the voltage peaks which occur in the vehicle electrical system of the vehicle in the event of a load dump to about 17 volts. This battery thereby absorbs the small over-voltages. Nevertheless, in the event of the battery being disconnected (due for example to a supply cable breaking), a very high over-voltage may occur in the vehicle electrical system. What happens is that the current produced by the machine charges the capacitances (including the parasitic capacitances) connected to the vehicle electrical system, and consequently causes a large rise in the d.c. voltage on the vehicle electrical system.

There is a risk of this over-voltage damaging the pieces of electrical equipment supplied by the vehicle electrical system. This is why all the vehicle's pieces of electrical equipment are sized to withstand a maximum voltage of about 32 volts, which corresponds to an over-voltage of about 20 volts.

There are various known solutions which enable the voltage on the vehicle electrical system to be limited to a maximum permitted voltage, i.e. the highest voltage which the pieces of electrical equipment of the vehicle are able to withstand without the risk of their being damaged.

The solution which is explained in patent application FR 2874765 takes account of the future use of 42 volt batteries in vehicles, as is made necessary by the tendency of pieces of electrical equipment with a high energy consumption to increase in number. The fact is that, under the specifications laid down in a future European standard (still being written), the pieces of electrical equipment connected to the vehicle's electrical system will probably have to be sized to operate at a voltage of up to 48 volts, and to withstand a maximum voltage of 58 volts, which corresponds to an over-voltage of only 10 volts.

In a conventional basic architecture where a control and power module for a rotary electrical machine having a plurality of phase windings comprises:
  a power circuit comprising which comprises a plurality of arms which are intended to be associated with a plurality of phase windings, and
  a control circuit which is constructed to operate the power circuit when the machine is operating in a nominal mode,
the solution which is described in document FR 2874765 proposes the construction of the control circuit in order, in addition:
  to monitor an output voltage from the power circuit,
  to lock at least one arm of the power circuit in a conductive state when the output voltages reaches a first threshold level, such that the machine operates in a degraded mode,
  to return the machine to operation in the nominal mode when the output voltage reaches a second threshold level.

However, this criterion for returning to the nominal mode of operation, based as it is on the output voltage, has the disadvantage of not being representative of the actual change in state, magnetically speaking, of the rotary machine, which is the only thing which enables the load dump on the electrical system to be compensated for effectively.

BRIEF SUMMARY OF THE INVENTION

The present invention therefore aims to mitigate this disadvantage.

The very thing to which it relates is a method of controlling a rotary electrical machine which is connected to an electrical system, in the event of a load dump.

This machine comprises, arranged in a manner known per se:
  a plurality of phase windings,
  a power circuit which comprises a plurality of arms, each formed by a bridge of switches, which are intended to be associated with the phase windings, which power circuit is capable of supplying the electrical system at an output voltage equal to a nominal voltage when the bridge of switches is in a nominal mode of operation,
  an excitation winding through which flows an excitation current which produces a magnetic flux in a magnetic excitation circuit,
  an electronic control and regulating circuit which operates the power circuit and controls the excitation current.

The method of control according to the invention is advantageously of the type, known in the prior art, which comprises locking the bridge of switches in at least one of the arms of the power circuit in a conductive state when the output voltage exceeds a predetermined voltage threshold higher than the nominal voltage but remarkably, and in contrast to the method disclosed in application FR 2874765, the nominal mode of operation of the bridge of switches is returned to independently of the output voltage.

The nominal mode of operation of the bridge of switches is preferably returned to after a predetermined delay at least equal to the de-magnetisation time of the magnetic excitation circuit.

Alternatively, the nominal mode of operation of the bridge of switches is preferably returned to when the excitation current drops below a predetermined current threshold.

Alternatively again, the nominal mode of operation of the bridge of switches is advantageously returned to after a period at least equal to the de-magnetisation time of the magnetic excitation circuit and when the excitation current drops below a predetermined current threshold.

In the method of control according to the invention, benefit is gained from the fact that the power circuit also comprises means for storing energy.

Preferably, the method of control for a rotary electrical machine according to the invention is implemented in the event of a load dump on a vehicle electrical system of a motor vehicle.

The present invention also relates to a control and power module for a rotary electrical machine which is connected to an electrical system, this machine having a plurality of phase windings, and an excitation winding through which flows an excitation current which produces a magnetic flux in a magnetic excitation circuit.

The control and power module comprises, arranged in a manner known per se:

- a power circuit which comprises a plurality of arms, each formed by a bridge of switches, which are intended to be associated with the phase windings, which power circuit is capable of supplying the electrical system at an output voltage equal to a nominal voltage when the bridge of switches is in a nominal operating mode,
- an electronic control and regulating circuit which operates the power circuit and which controls the excitation current, this electronic circuit also comprising means for locking the bridge of switches in an least one of the arms of the power circuit in a conductive state when the output voltage exceeds a predetermined voltage threshold higher than the nominal voltage.

In accordance with the invention, this control and regulating module also comprises means for returning to the nominal mode of operation of the bridge of switches independently of the output voltage.

These returning means preferably act after a predetermined delay at least equal to the de-magnetisation time of the magnetic excitation circuit.

Alternatively, these returning means preferably act when the excitation current drops below a predetermined current threshold.

Alternatively again, these returning means advantageously act after a period at least equal to the de-magnetisation time of the magnetic excitation circuit and when the excitation current drops below a predetermined current threshold.

The power circuit of the control and power module according to the invention also preferably comprises means for storing energy.

The invention also relates to a rotary electrical machine comprising a control and power module as described above.

The principal details specified above will have made the advantages afforded by the invention in comparison with the prior art obvious to the person skilled in the art.

The detailed specification of the invention is given in the following description in conjunction with the accompanying drawings. It should be noted that the only purpose of these drawings is to illustrate the text of the description and that they do not in any way constitute a limitation of the scope of the invention.

DETAILED DESCRIPTION OF THE PREFERRED EMBODIMENTS OF THE INVENTION

Figure 1:
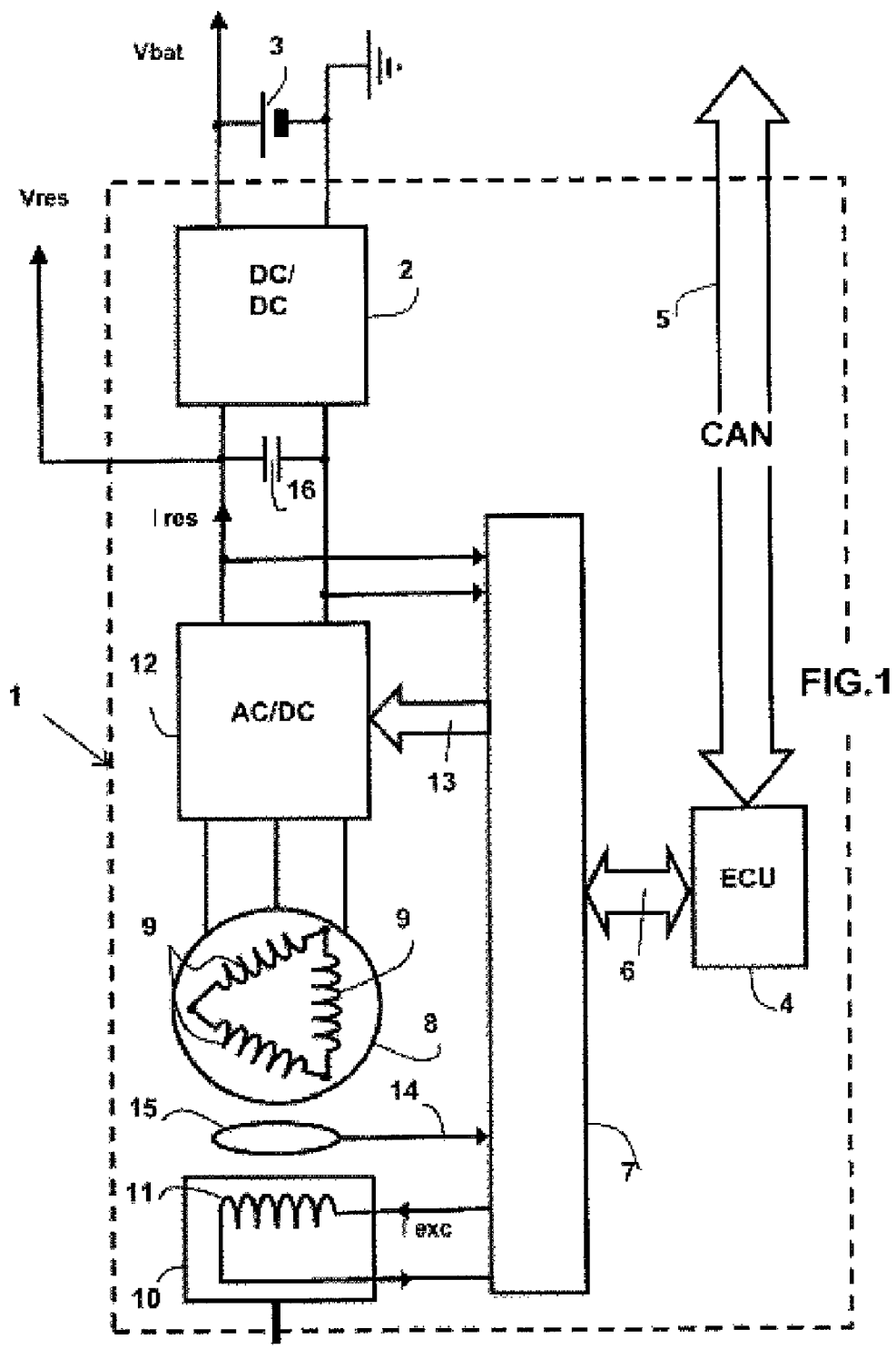
FIG. 1 is a general diagram of a micro-hybrid system comprising an alternator-starter of the type known as "14+X" which is intended to supply the self-generated electrical energy of a motor vehicle.

The preferred embodiments of the invention are particularly well adapted to a micro-hybrid system 1 as shown in FIG. 1.

The micro-hybrid system 1 comprises a rotary electrical machine supplying electrical energy to, on the one hand, the so-called "14+X" vehicle electric system, i.e. a system voltage Vres of a nominal value Vn greater than 14 V and, on the other hand, a reversible d.c./d.c. converter 2 which supplies the vehicle battery 3 to which the vehicle's standard 12 V electrical system is connected.

The micro-hybrid system 1 also comprises an electronic control unit 4 which interfaces with a vehicle bus 5 of the CAN type which exchanges information 6 with an electronic control and regulating circuit 7 for the rotary electrical machine.

The rotary electrical machine is preferably a three-phase machine whose stator 8 comprises phase windings 9.

The magnetic excitation circuit forms a rotor 10 of the machine and comprises an excitation winding 11 for which the excitation current I exc is controlled by the electronic control and regulating circuit 7.

The phase windings 9 are connected to a reversible a.c./d.c. converter 12 belonging to a power circuit.

This converter 12 is operated 13 by the electronic control and regulating circuit 7 as a function of the signals 14 coming from sensors 15 for the position of the rotor 10, in such a way as to charge an ultracapacitor 16 belonging to the power circuit at the nominal voltage Vn of the "14+X" system.

In the preferred case of a three-phase machine, the converter 12 comprises three arms which are intended to each be associated with respective ones of the three phase windings 9.

Each of the arms is formed by a bridge of switches which operates as a synchronous rectifier in a nominal mode of operation.

Figure 2A:
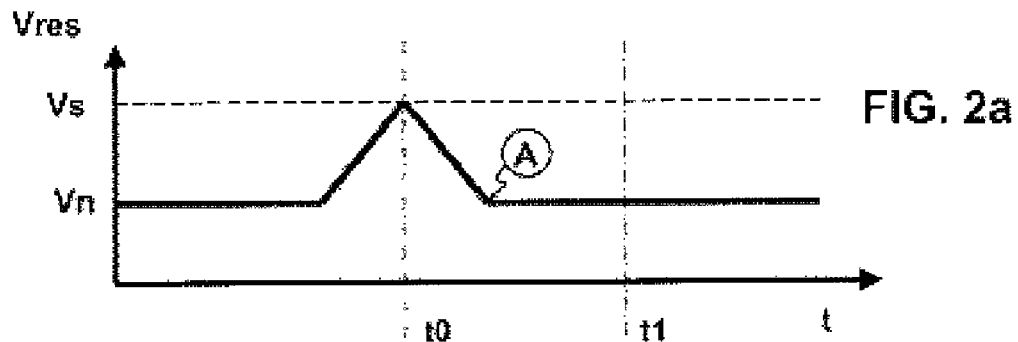
FIGS. 2a, 2b and 2c show, respectively, the variation over time of the voltage in the vehicle electrical system of the "14+X" type in the event of a load dump, and the variation in the current put out by the alternator-starter and the variation in the excitation current under the same circumstances.

As shown in FIG. 2a, in the event of a load dump on the electrical system, the output voltage Vres from the a.c./d.c. converter suddenly increases without the regulation by the system 1, which is based on control of the excitation current I exc, being adequate to control the over-voltage due to the time constant of the excitation circuit.

To enable this over-voltage to be controlled quickly, the switches in the bridges are switched to a conductive state as soon as the output voltage Vres reaches a voltage threshold Vs at a time to.

Figure 2B:
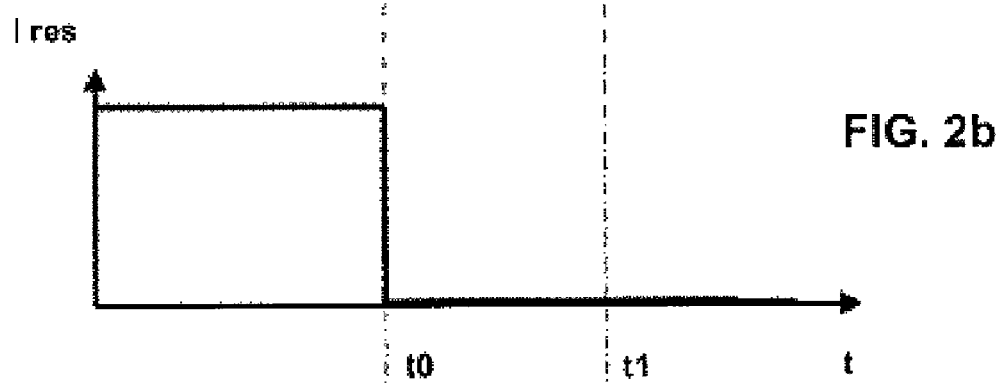

The phase windings 9 being short-circuited at this time, the current I res fed to the electrical system becomes zero, as shown in FIG. 2b.

Figure 2C:
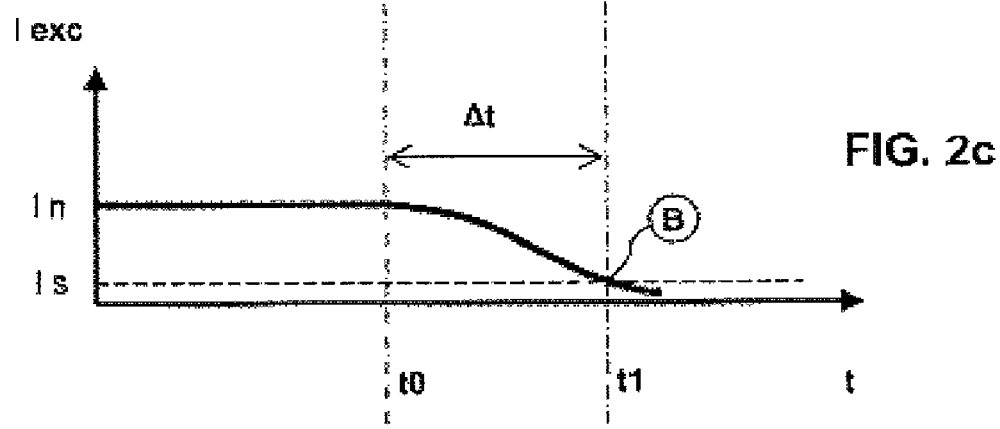

The fall in the excitation current I exc, as from the time to, which is shown in FIG. 2c derives from the normal operation of the regulating system.

As soon as the over-voltage is detected, the regulating system brings a nominal excitation current I n back to zero, but the de-magnetisation of the rotor 10 can only be achieved after an interval of time $\Delta t$, which corresponds to the response time of the magnetic excitation circuit 10 for an effective change of state, magnetically speaking, of the electrical machine (point B). In practice, this interval of time $\Delta t$ is of the order of 300 ms.

The nominal mode of operation of the bridges of switches as synchronous rectifiers is thus only returned to, at the time t1, after a predetermined delay at least equal to the interval of time Δt.

This delay is implemented either by means of a dedicated relay circuit in the electronic control and regulating circuit 7 or by means of appropriate micro-software.

In a variant, the nominal mode of operation of the bridges of switches is only returned to when the excitation current I exc drops below a predetermined current threshold I s at the point B, as is also shown in FIG. 2c. This current threshold is preferably of the order of 1 A.

In this variant, the comparison of the excitation current with the threshold current is performed by the control and regulating circuit 7 either by means of a specific comparator circuit or by an adaptation of the micro-software.

In another variant, the electronic control and regulating circuit 7 combines the information on the crossing of the predetermined current threshold I s by the excitation current I exc and that on the expiry of a period of time at least equal to the de-magnetisation time Δt to determine the time t1 when the nominal mode of operation of the bridges of switches is returned to.

When the over-voltage phenomenon comes to an end (at point A in FIG. 2a), the maintaining of the nominal voltage Vn on the electrical system is performed by the reversible d.c./d.c. converter 2 from the battery 3 throughout the entire period of short-circuiting of the phase windings 9.

It goes without saying that the invention is not limited simply to the preferred embodiments which are described above.

In particular, the nominal mode of operation of the bridges of switches may be returned to under criteria which are independent of the output voltage Vres and which are other than those described above, such a criterion being for example when the voltage at the terminals of the excitation winding 11 is below a predetermined threshold level.

The example of a three-phase rotary electrical machine whose magnetic excitation circuit forms the rotor 10 and whose phase windings 9 form the stator 8 is not limiting either: the above description would apply equally well to a rotary electrical machine in which, without any basic change, the stator and the rotor swapped roles and the number of phases was increased.

The invention thus does indeed cover all the possible variant embodiments which would remain within the scope defined by the following claims.

The invention claimed is:

1. A method of controlling a rotary electrical machine connected to an electrical system in the event of a load dump, the machine comprising:
    a plurality of phase windings (9);
    a power circuit (12, 16) comprising a plurality of arms, each formed by a bridge of switches associated with one of the phase windings (9), the power circuit (12, 16) provided for supplying the electrical system at an output voltage (Vres) equal to a nominal voltage (Vn) when the bridge of switches is in a nominal mode of operation;
    an excitation winding (11) through which flows an excitation current (I exc) producing a magnetic flux in a magnetic excitation circuit (10); and
    an electronic control and regulating circuit (7) operating the power circuit (12, 16) and controlling the excitation current (I exc);
    the method comprises comprising the steps of:
    locking the bridge of switches in at least one of the arms of the said power circuit (12, 16) in a conductive state when the output voltage (Vres) exceeds a predetermined voltage threshold (Vs) higher than the said nominal voltage (Vn);
    the nominal mode of operation of the bridge of switches is returned to independently of the said output voltage (Vres).

2. The method of controlling the rotary electrical machine according to claim 1, wherein the nominal mode of operation of the bridge of switches is returned to after a predetermined delay at least equal to a de-magnetization time (Δt) of the magnetic excitation circuit (10).

3. The method of controlling the rotary electrical machine according to claim 1, wherein the nominal mode of operation of the bridge of switches is returned to when the excitation current (I exc) drops below a predetermined current threshold (I s).

4. The method of controlling the rotary electrical machine according to claim 1, wherein the nominal mode of operation of the said bridge of switches is returned to after a period at least equal to a de-magnetization time (Δt) of the magnetic excitation circuit and when the excitation current (I exc) drops below a predetermined current threshold (I s).

5. The method of controlling a rotary electrical machine according to claim 1, wherein the power circuit (12, 16) also comprises means for storing energy (16).

6. The method of controlling a rotary electrical machine according to claim 1, wherein the electrical system is a vehicle electrical system of a motor vehicle.

7. A control and power module (7, 12, 16) for a rotary electrical machine connected to an electrical system, the machine having a plurality of phase windings (9) and an excitation winding (11) through which flows an excitation current (I exc) producing a magnetic flux in a magnetic excitation circuit (10), the module (7, 12, 16) comprising:
    a power circuit (12, 16) comprising a plurality of arms, each formed by a bridge of switches associated with one of the phase windings (9), the power circuit (12, 16) of provided for supplying the electrical system at an output voltage (Vres) equal to a nominal voltage (Vn) when the bridge of switches is in a nominal operating mode; and
    an electronic control and regulating circuit (7) operating the power circuit (12, 16) and controlling the excitation current (I exc), the electronic circuit (7) also comprising means for locking the bridge of switches in an least one of the arms of the power circuit (12, 16) in a conductive state when the output voltage (Vres) exceeds a predetermined voltage threshold higher than the nominal voltage (Vn);
    the module also comprising means for returning to the nominal mode of operation of the bridge of switches independently of the output voltage (Vres).

8. The control and power module (7, 12, 16) according to claim 7, wherein the returning means act after a predetermined delay at least equal to a de-magnetization time (Δt) of the said magnetic excitation circuit (10).

9. The control and power module (7, 12, 16) according to claim 7, wherein the returning means act when the excitation current (I exc) drops below a predetermined current threshold (I s).

10. The control and power module (7, 12, 16) according to claim 7, wherein the returning means act after a period at least equal to the de-magnetization time (Δt) of the magnetic excitation circuit (10) and when the excitation current (I exc) drops below a predetermined current threshold (I s).

11. The control and power module (7, 12, 16) according to claim 7, wherein the power circuit also comprises means for storing energy (16).

12. A rotary electrical machine connected to an electrical system, the electrical machine comprising:
- a plurality of phase windings (9);
- an excitation winding (11) through which flows an excitation current (I exc) which produces a magnetic flux in a magnetic excitation circuit (10); and
- a control and power module (7, 12, 16) comprising:
    - a power circuit (12, 16) comprising a plurality of arms, each formed by a bridge of switches associated with one of the phase windings (9), the power circuit (12, 16) provided for supplying the electrical system at an output voltage (Vres) equal to a nominal voltage (Vn) when the bridge of switches is in a nominal operating mode; and
    - an electronic control and regulating circuit (7) operating the power circuit (12, 16) and controling the excitation current (I exc), the electronic circuit (7) also comprising means for locking the bridge of switches in an least one of the arms of the power circuit (12, 16) in a conductive state when the output voltage (Vres) exceeds a predetermined voltage threshold higher than the nominal voltage (Vn);
    - the module also comprising means for returning to the nominal mode of operation of the bridge of switches independently of the output voltage (Vres).

13. The rotary electrical machine according to claim 12, wherein the returning means act after a predetermined delay at least equal to a de-magnetization time (Δt) of the magnetic excitation circuit (10).

14. The rotary electrical machine according to claim 12, wherein the returning means act after a period at least equal to the de-magnetization time (Δt) of the magnetic excitation circuit (10) and when the excitation current (I exc) drops below a predetermined current threshold (I s).

* * * * *